United States Patent
Hsu

(10) Patent No.: US 7,495,704 B2
(45) Date of Patent: Feb. 24, 2009

(54) METHOD AND APPARATUS FOR DISPLAYING FRAME RATE ALTERED VIDEO ON INTERLACED DISPLAY DEVICE

(75) Inventor: Rong-Fu Hsu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 572 days.

(21) Appl. No.: 11/060,738

(22) Filed: Feb. 18, 2005

(65) Prior Publication Data
US 2006/0187340 A1 Aug. 24, 2006

(51) Int. Cl.
*H04N 7/01* (2006.01)
(52) U.S. Cl. ....................... 348/441; 348/581
(58) Field of Classification Search ........... 348/441, 348/443, 445, 446, 454, 458, 459, 556, 581, 348/448; 386/131, 124, 125, 129
See application file for complete search history.

(56) References Cited

U.S. PATENT DOCUMENTS

| | | | |
|---|---|---|---|
| 5,089,893 A | 2/1992 | Iwase | |
| 5,283,651 A | 2/1994 | Ishizuka | |
| 5,519,446 A | 5/1996 | Lee | |
| 5,621,870 A | 4/1997 | Shyu et al. | |
| 5,912,710 A * | 6/1999 | Fujimoto | 348/445 |
| 5,917,950 A * | 6/1999 | Yim | 382/236 |
| 6,118,486 A * | 9/2000 | Reitmeier | 348/441 |
| 6,147,712 A * | 11/2000 | Shimamoto et al. | 348/446 |
| 6,151,074 A * | 11/2000 | Werner | 348/425.1 |
| 6,151,075 A * | 11/2000 | Shin et al. | 348/459 |
| 6,678,006 B1 * | 1/2004 | Velez et al. | 348/564 |
| 6,727,958 B1 * | 4/2004 | Shyu | 348/581 |
| 2007/0002167 A1 * | 1/2007 | Hsu | 348/441 |

* cited by examiner

*Primary Examiner*—Paulos M Natnael
(74) *Attorney, Agent, or Firm*—Jianq Chyun IP Office

(57) ABSTRACT

An apparatus for displaying a motion video on a display system includes a decoder for decoding the motion video to provide a decoded picture, the decoded picture having a first frame size and a first scan rate different from a second frame size and a second scan rate of the display system, respectively, a filter for converting the decoded picture into an intermediate picture, and then converting the intermediate picture into a resized frame picture having the second frame size, a memory for storing resized frame pictures sent from the filter, and a controller for controlling output of the resized frame pictures from the memory in a sequence by assigning the resized frame pictures over successive field time intervals in accordance with the ratio between the first scan rate and the second scan rate.

16 Claims, 8 Drawing Sheets

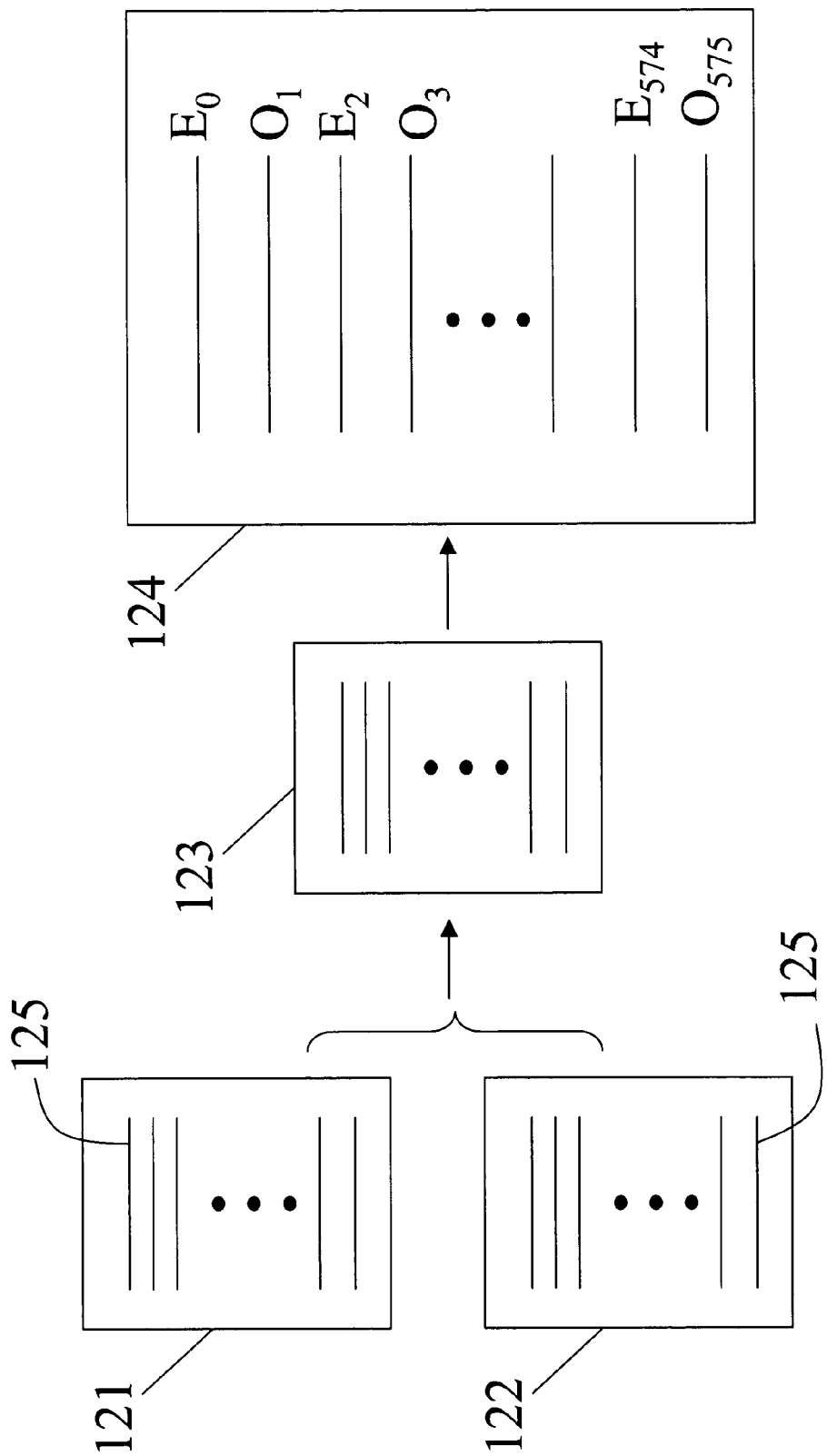

METHOD AND APPARATUS FOR DISPLAYING FRAME RATE ALTERED VIDEO ON INTERLACED DISPLAY DEVICE

BACKGROUND

I. Field of the Invention

The present invention relates generally to a method and apparatus for digital video processing, and more particularly, to a method and apparatus for displaying a video image on an interlaced display device with altered frame rate.

II. Background of the Invention

A digital versatile disc ("DVD") video program is generally encoded in one of the following three frame formats having different resolutions and scan rates. The first frame format, having a resolution of 720×480 and a scan rate at 29.97 frames per second, is suitable for use in the National Television Standards Committee ("NTSC") color television system provided for North America and Japan. The second frame format, having a resolution of 720×480 and a scan rate at 23.976 frames per second, is generally used to encode film movies. The third frame format, having a resolution of 720×576 and a scan rate at 25 frames per second, is suitable for use in the Phase Alternating Line ("PAL") color television system provided for Europe and China. The first, second and third frame formats are collectively called as D1 format.

The NTSC and PAL scan formats have been widely used for commercial television systems. Both of the NTSC and PAL formats use interlaced scanning to reduce flicker. The NTSC scan format has a vertical refresh rate of 59.94 fields per second, whereas the PAL scan format has a vertical refresh rate of 50 fields per second. A vertical refresh rate refers to a rate at which one field of a frame is transmitted. In a display system such as a television system, a frame is created by scanning an electron beam horizontally across the screen from left to right, then moving back to the left, and scanning across the screen again. This process is repeated until all lines have been scanned, thus completing one frame of video. A complete frame interval includes an even field interval period and an odd field interval following the even field period, or vice versa. To properly display a DVD title or program on a television system, the DVD title must have an appropriate number of field lines, of which even field lines are displayed in an even field interval and odd field lines are displayed in an odd field interval. Each of the field lines includes an even or odd polarity.

It may sometimes be required to display a DVD title on a display system having a different format from that of the DVD title, for example, to display an NTSC-formatted title on a PAL television system, or vice versa. Due to the difference in vertical refresh rate between the NTSC and PAL systems, it is not possible to properly display an NTSC-formatted DVD title on a PAL display system. Moreover, to display a DVD title on a display system of 720-lines/50 Hz (PAL) or 720-lines/59.94 Hz (NTSC) that have respectively 576 and 480 active lines in a frame time, it is necessary to modify the frame size to suit the interlaced display system. It is therefore desirable to have a method and apparatus for displaying a DVD title on a display system by providing enough resolution from a spatial point of view and maintain continuity of motion from a temporal point of view.

BRIEF SUMMARY OF THE INVENTION

The present invention is directed to a method and apparatus that obviate one or more problems resulting from the limitations and disadvantages of the prior art.

In accordance with an embodiment of the present invention, there is provided an apparatus for displaying a motion video on a display system that comprises a decoder for decoding the motion video to provide a decoded picture, the decoded picture having a first frame size and a first scan rate different from a second frame size and a second scan rate of the display system, respectively, a filter for converting the decoded picture into an intermediate picture, and then converting the intermediate picture into a resized frame picture having the second frame size, a memory for storing resized frame pictures sent from the filter, and a controller for controlling output of the resized frame pictures from the memory in a sequence by assigning the resized frame pictures over successive field time intervals in accordance with the ratio between the first scan rate and the second scan rate.

Also in accordance with the present invention, there is provided an apparatus for displaying a motion video on a display system that comprises a decoder for decoding the motion video to provide a decoded picture and a first signal indicating a first format of the decoded picture, a selector for providing a second signal indicating a second format of the display system, a filter in response to the first signal and second signal for decimating the decoded picture to form an intermediate picture, and then expanding the intermediate picture to form a resized frame picture having a frame size of the second format for display on the display system, a memory for storing resized frame pictures sent from the filter, and a controller in response to the first signal and second signal for assigning the resized frame pictures over successive field time intervals in a sequence in accordance with the ratio between a first scan rate of the first format and a second scan rate of the second format when the resized frame pictures are outputted from the memory.

Further in accordance with the present invention, there is provided a method for displaying a motion video on a display system that comprises decoding the motion video to provide a decoded picture, determining a first frame size and a first scan rate of the decoded picture, determining a second frame size and a second scan rate of the display system, which are different from the first frame size and first scan rate of the decoded picture, respectively, converting the decoded picture into an intermediate picture, converting the intermediate picture into a resized frame picture having the second frame size, storing resized frame pictures in a memory, and controlling output of the resized frame pictures from the memory in a sequence by assigning the resized frame pictures over successive field time intervals in accordance with the ratio between the first scan rate and the second scan rate.

Still in accordance with the present invention, there is provided a method for displaying a motion video on a display system that comprises the steps of decoding the motion video to provide a decoded picture, providing a first signal indicating a first format of the decoded picture, providing a second signal indicating a second format of the display system, decimating in response to the first signal and second signal the decoded picture to form an intermediate picture, expanding the intermediate picture to form a resized frame picture having a frame size of the second format for display on the display system, storing resized frame pictures in a memory, and assigning in response to the first signal and second signal the resized frame pictures over successive field time intervals in a sequence in accordance with the ratio between a first scan rate of the first format and a second scan rate of the second format when the resized frame pictures are outputted from the memory.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serves to explain the principles of the invention.

BRIEF DESCRIPTION OF THE DRAWINGS

Reference will now be made in detail to the present embodiment of the invention, an example of which is illustrated in the accompanying drawings. Wherever possible, the same reference numbers are used throughout the drawings to refer to the same or like parts.

FIGS. 2A and 2B are schematic diagrams illustrating the resizing operation of a resize filter in accordance with one embodiment of the present invention;

DETAILED DESCRIPTION OF THE INVENTION

Figure 1A:
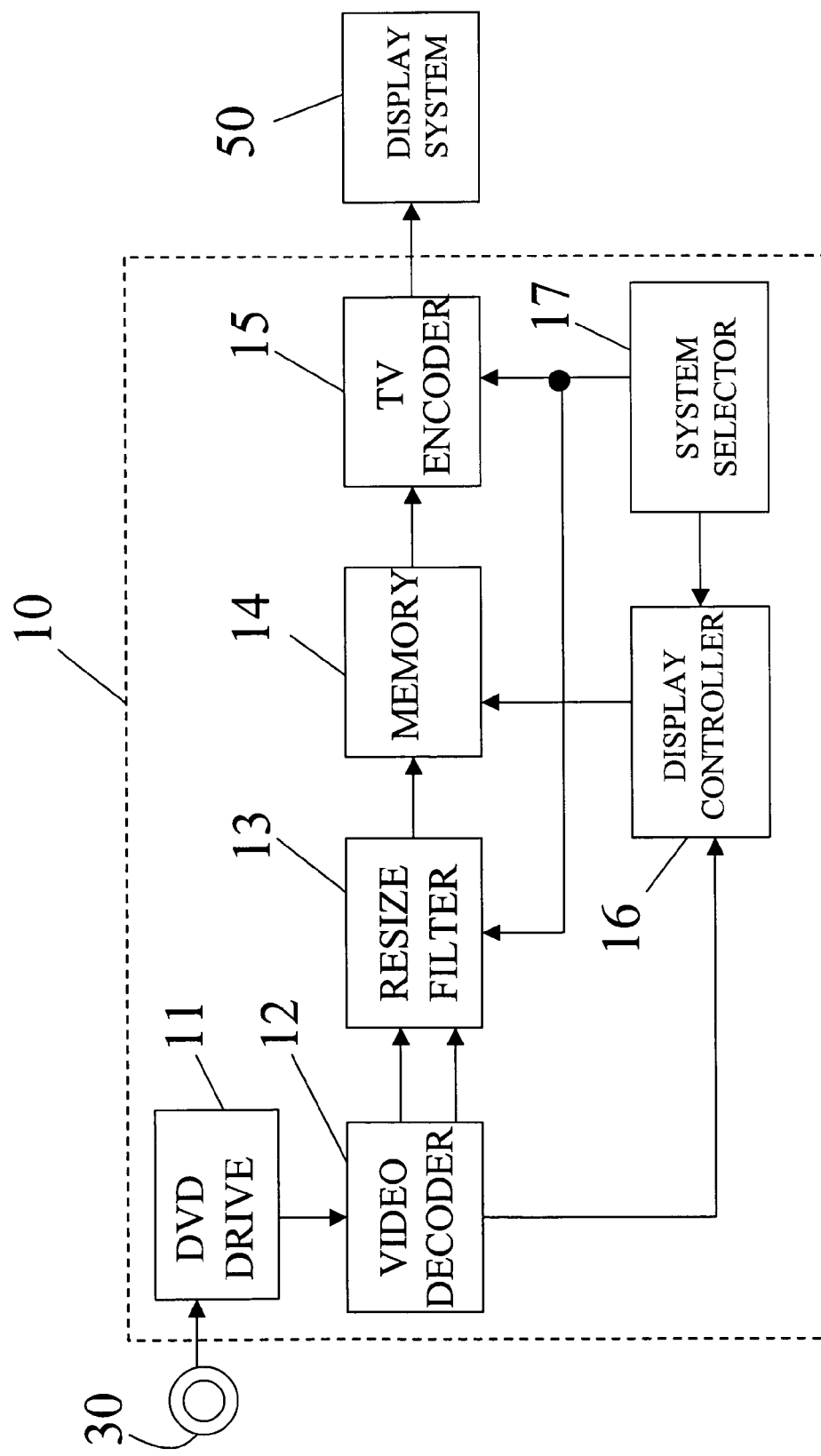
FIG. 1A is a schematic circuit block diagram of a video display apparatus in accordance with one embodiment of the present invention.

FIG. 1 is a schematic circuit block diagram of a video display apparatus 10 in accordance with one embodiment of the present invention. Referring to FIG. 1, video display apparatus 10 includes a digital versatile disc ("DVD") drive 11, a video decoder 12, a resize filter 13, a memory 14, a television ("TV") encoder 15, a display controller 16, and a system selector 17. In operation, DVD drive 11 reads the contents of a disc 30 and sends the contents to video decoder 12. Video decoder 12, connected to DVD drive 11, decodes the contents of disc 30 into decoded frame pictures or decoded field pictures, and determines format information including, for example, the picture format, frame rate and field rate, contained in the decoded frame or field pictures. Video decoder 12 on one hand sends the decoded frame or field pictures to resize filter 13, and on the other hand sends the format information to resize filter 13 and display controller 16.

System selector 17 determines the scan format of display system 50, for example, a television monitor. The scan format, as previously described, includes one of the NTSC or PAL format. System selector 17 provides a select signal to resize filter 13, TV encoder 15 and display controller 16, indicating the scan format of display system 50.

In response to the format information from video decoder 12 and the select signal from system selector 17, resize filter 13 performs a resizing operation to resize the decoded pictures and obtain resized frames having a frame size consistent with that of display system 50. The function of resize filter 13 and the resized frames will be discussed in detail with respect to FIGS. 2A and 2B. Resized frames are then stored in memory 14. In response to the format information and the select signal, display controller 16 determines the addresses in memory 14 corresponding to the resized frames, and controls memory 14 to output the resized frames in the form of even and odd fields with a timing sequence that complies with field scanning characteristics of display system 50. TV encoder 15 is connected to memory 14 and system selector 17, and is adapted to be connected to display system 50. In response to the select signal from system selector 17, TV encoder 15 encodes and converts the output of memory 14 to obtain a converted output in an analog format that complies with video characteristics of display system 50.

Figure 1B:
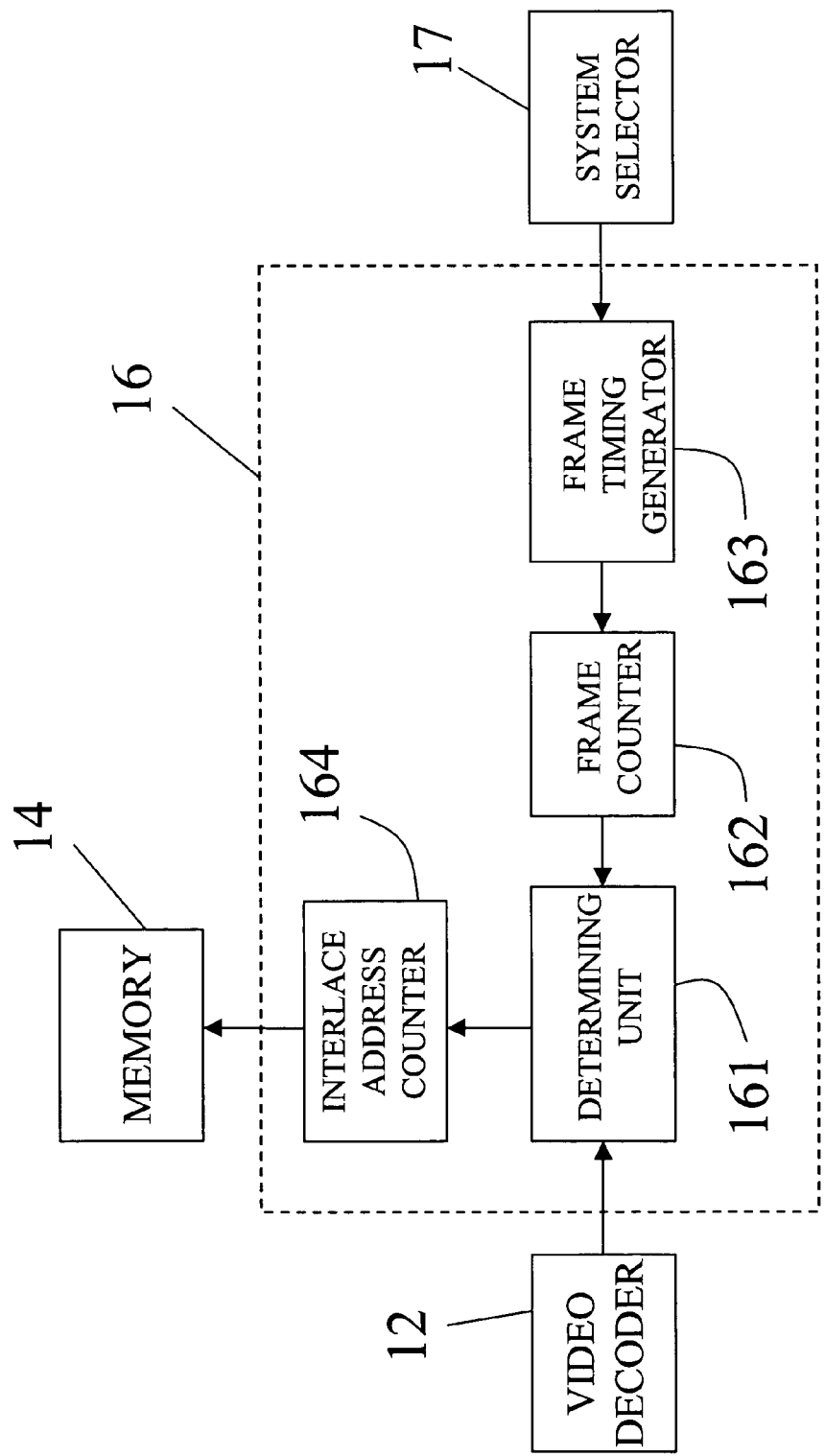
FIG. 1B is a schematic circuit block diagram of a display controller of the video display apparatus shown in FIG. 1A.

FIG. 1B is a schematic circuit block diagram of display controller 16 of video display apparatus 10 shown in FIG. 1A. Referring to FIG. 1B, display controller 16 includes a determining unit 161, a frame counter 162, a frame timing generator 163, and an interlace address counter 164. Frame timing generator 163, connected to system selector 17, generates a frame rate signal in response to the select signal from system selector 17. The frame rate signal may include at least one of a vertical synchronization signal, a horizontal synchronization signal or a field polarity signal. A vertical synchronization signal is enabled for a period, i.e., a field time, for scanning a field. A field polarity signal indicates the polarity, i.e., even or odd, of a field. A frame time consists of an even field time and an odd field time. Frame counter 162, connected between frame timing generator 163 and determining unit 161, generates a count value in response to a frame rate signal from frame timing generator 163. As an example, during a 1-second period, frame counter generates count values from 1 to 50 if display system 50 is a PAL system, or from 1 to 60 if display system 50 is an NTSC system. Determining unit 161, in response to a count value from frame counter 162 and the format information from video decoder 12, determines an addressing sequence for the interlace address counter 164 to address the resized frames stored in memory 14. Specifically, interlace address counter 164, connected between determining unit 161 and memory 14, counts a set of consecutive even addresses that correspond to even lines of the resized frames during even field times, and a set of consecutive odd addresses that correspond to odd lines of the resized frames during odd field times. Determining unit 161 determines the addresses of lines corresponding to a field of the resized frames in response to a count value.

Figure 2B:
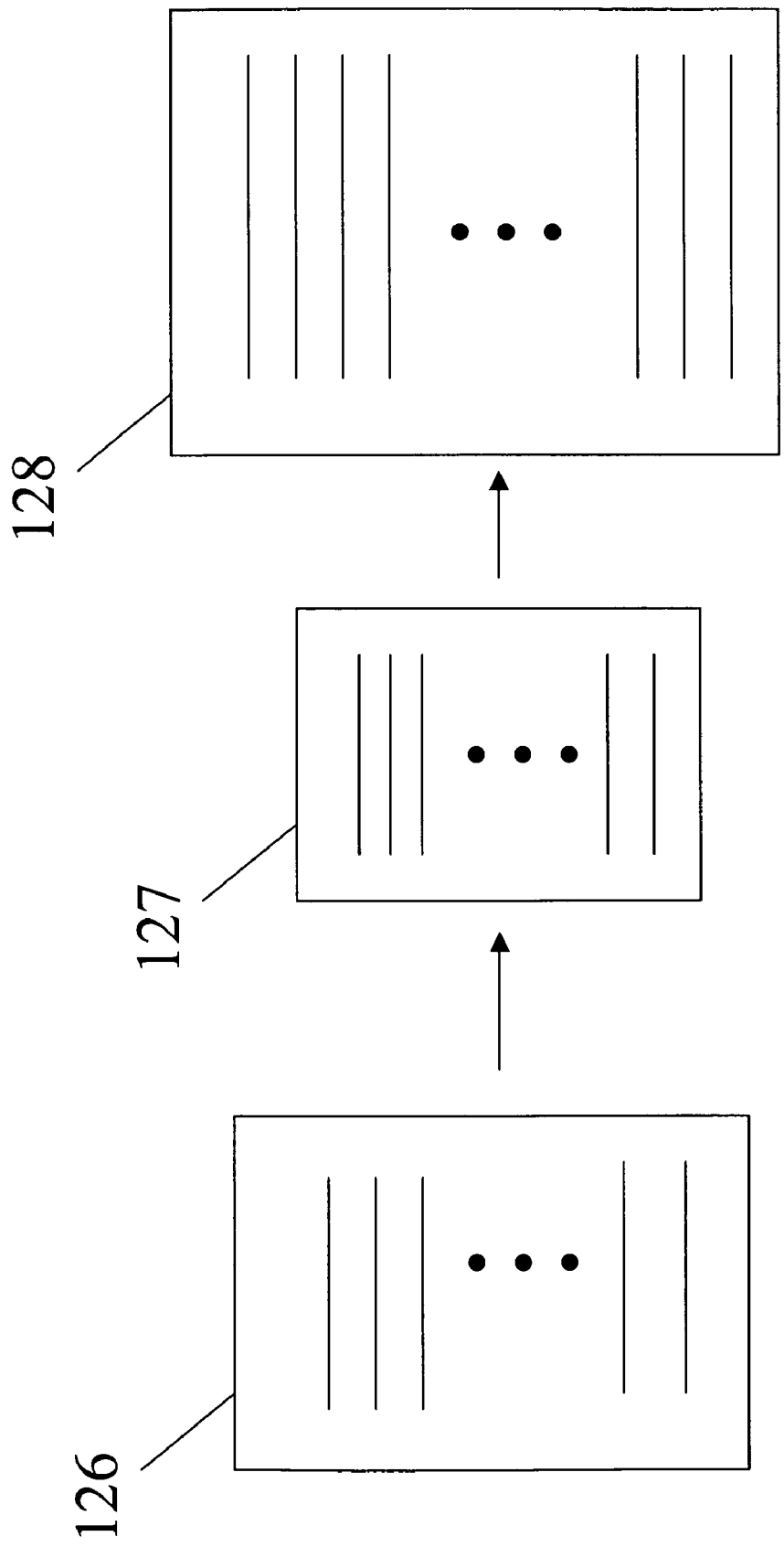

FIGS. 2A and 2B are schematic diagrams illustrating the resizing operation of a resize filter in accordance with one embodiment of the present invention. Referring to FIG. 2A, decoded field pictures 121 and 122 sent from video decoder 12 include, for example, one even-polarity field and one odd-polarity field, respectively. Resize filter 13 performs a decimation operation on decoded field pictures 121 and 122 to obtain a decimated field picture 123. The decimation operation may include skipping one of decoded field pictures 121 or 122, filtering decoded field pictures 121 and 122, or using other resizing techniques known to skilled persons in the art.

Resize filter 13 then performs an expansion operation on decimated field picture 123 to obtain a resized frame 124. The expansion operation may include duplicating lines of decimated field picture 123, or using other resizing techniques known to skilled persons in the art. As an example of an NTSC-formatted disc to be displayed on a PAL display system, decoded field pictures 121 and 122 each including 240 scan lines 125 are converted into resized frame 124 including 576 scan lines, which comprise even lines $E_0, E_2 \ldots$ and $E_{574}$, and odd lines $O_1, O_3 \ldots$ and $O_{575}$. The even lines $E_0, E_2 \ldots$ and $E_{574}$ are displayed during an even field time, while the odd lines $O_1, O_3 \ldots$ and $O_{575}$ are displayed during an odd field time.

Resized frame 124 is stored in memory 14. Each of the scan lines of resized frame 124 includes pixels each further including luminance (Y) and chrominance (Cb and Cr) pixel elements. Referring to FIG. 1B, interlace address counter 164, in response to an identification signal sent from determining unit 161, provides an address for the pixel elements of each of the scan lines of resized frame 124.

Referring to FIG. 2B, resize filter 13 performs a decimation operation on a decoded frame picture 126 sent from video decoder 12 to obtain a decimated field picture 127, and then performs an expansion operation on decimated field picture 127 to obtain a resized frame 128. The decimation operation may include skipping every other scan line of decoded frame picture 126, filtering scan lines of decoded frame picture 126, or using other resizing techniques known to skilled persons in the art. The expansion operation may include duplicating scan lines of decimated field picture 127, or other resizing techniques known to skilled persons in the art. One example of the resizing techniques is disclosed in U.S. Pat. No. 5,621,870, entitled "Method and Apparatus for Uniformly Scaling a Digital Image," by the applicant. Alternatively, the decimation operation may also include replicating every scan line of decoded frame picture 126, that is, to make decimated field picture 127 identical with decoded frame picture 126. This can preserve better quality for decimated field picture 127. The expansion operation in this case may include enlarging or contracting the size of decimated field picture 127 to obtain resized frame 128. When the size of resized frame 128 is required to be larger than decoded frame picture 126, enlargement is performed. On the contrary, contraction is performed.

Figure 3:
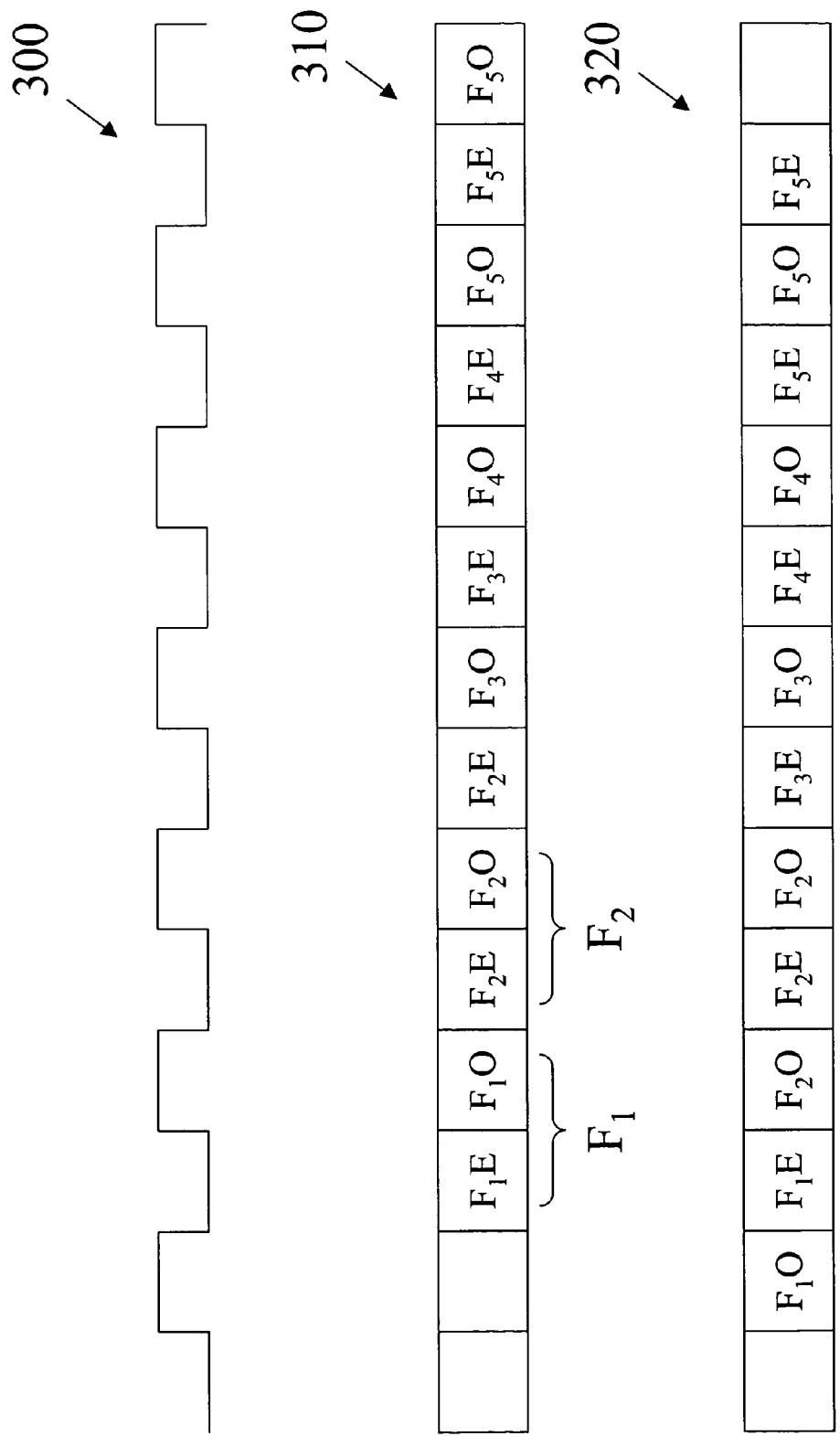
FIG. 3 is a schematic diagram illustrating a presentation sequence for displaying a PAL-formatted title on an NTSC-compliant display system in accordance with one embodiment of the present invention.

FIG. 3 is a schematic diagram illustrating a presentation sequence for displaying a PAL-formatted title on an NTSC-compliant display system in accordance with one embodiment of the present invention. Referring to FIG. 3, a PAL-formatted title is decoded and resized to obtain resized frames (not numbered), which include a first frame $F_1$, a second frame $F_2, \ldots$ etc. Even lines of the resized frames are provided during even field times, while odd lines of the resized frames are provided during odd field times. Each one of the resized frames is provided in a pair of fields including an even field and an odd field. As an example of the first frame $F_1$, its even field $F_1E$ and odd field $F_1O$ are provided in successive field times. In one example according to the present invention, as shown in FIG. 3, the logic high level of a field time signal 300 represents an odd field time, whereas the logic low level of field time signal 300 represents an even field time. In one aspect, the resized frames are provided in a sequence 310 starting from an even field time. In another aspect, the resized frames are provided in a sequence 320 starting from an odd field time.

As an example of sequence 310, referring also to FIG. 1A and 1B, video decoder 12 determines that the DVD title has a PAL format and provides a format information, and system selector 17 generates a select signal indicating that display system 50 has an NTSC format. Determining unit 161 of display controller 16, in response to the format information and the select signal, determines sequence 310 for providing the resized frames corresponding to the DVD title in accordance with field time signal 300. Since sequence 310 starts with an even field, a first field time corresponding to a count value of 1 in frame counter 162 is assigned to provide an even field $F_1E$ of first resized frame $F_1$. Even field $F_1E$ includes even lines, for example, $E_0, E_2, E_4, \ldots$, etc. of first resized frame $F_1$. Determining unit 161 provides an identification signal indicating the corresponding field, i.e., even field $F_1E$, for the first field time. Interlace address counter 164, in response to the identification signal, counts and generates a set of addresses for the corresponding field.

Similarly, a second field time corresponding to a count value of 2 in frame counter 162 is assigned to provide an odd field $F_1O$ of first resized frame $F_1$. Odd field $F_1O$ includes odd lines, for example, $O_1, O_3, O_5, \ldots$, etc. of first resized frame $F_1$. Determining unit 161 provides an identification signal indicating the corresponding field, i.e., odd field $F_1O$, for the second field time. Interlace address counter 164, in response to the identification signal, counts and generates a set of addresses for the corresponding field. In summary, interlace address counter 164 generates a set of consecutive even addresses that correspond to even lines of the resized frames during even field times, and a set of odd addresses that correspond to odd lines of the resized frames during odd field times.

In response to an address signal sent from interlace address counter 164 of display controller 16, memory 14 provides the resized frames to TV encoder 15 in sequence 310. Since the frame rate of the PAL title is 25 and the NTSC display system has a field rate of 59.94 fields per second, between which the ratio is approximately 5/12, in sequence 310, every five resized frames are provided in twelve successive field times. Moreover, since the five resized frames are only responsible for ten field time intervals, two additional fields from the five resized frames should be added to make twelve field times. In sequence 310, the fifth field time and the twelfth field time are added with the even field $F_2E$ of a second resized frame $F_2$ and the odd field $F_5O$ of a fifth resized frame $F_5$. In another embodiment, the fifth field time is added with the even field $F_3E$ of a third resized frame $F_3$. Likewise, in sequence 320, the fifth field time $F_2O$ may be replaced by the odd field $F_3O$ of a third resized frame $F_3$. Skilled persons in the art will understand that the alternatives of inserting the two additional fields into the sequence can be made only if an interlaced relationship between even and odd fields are observed. For example, a sequence may take the form of $F_1E, F_1O, F_2E, F_2O, F_3E, F_3O, F_3E, F_4O, F_4E, F_4O, F_5E$ and $F_5O$ in a sequential order, where $F_3E$ in the seventh field and $F_4O$ in the tenth field are additionally added.

Figure 4:
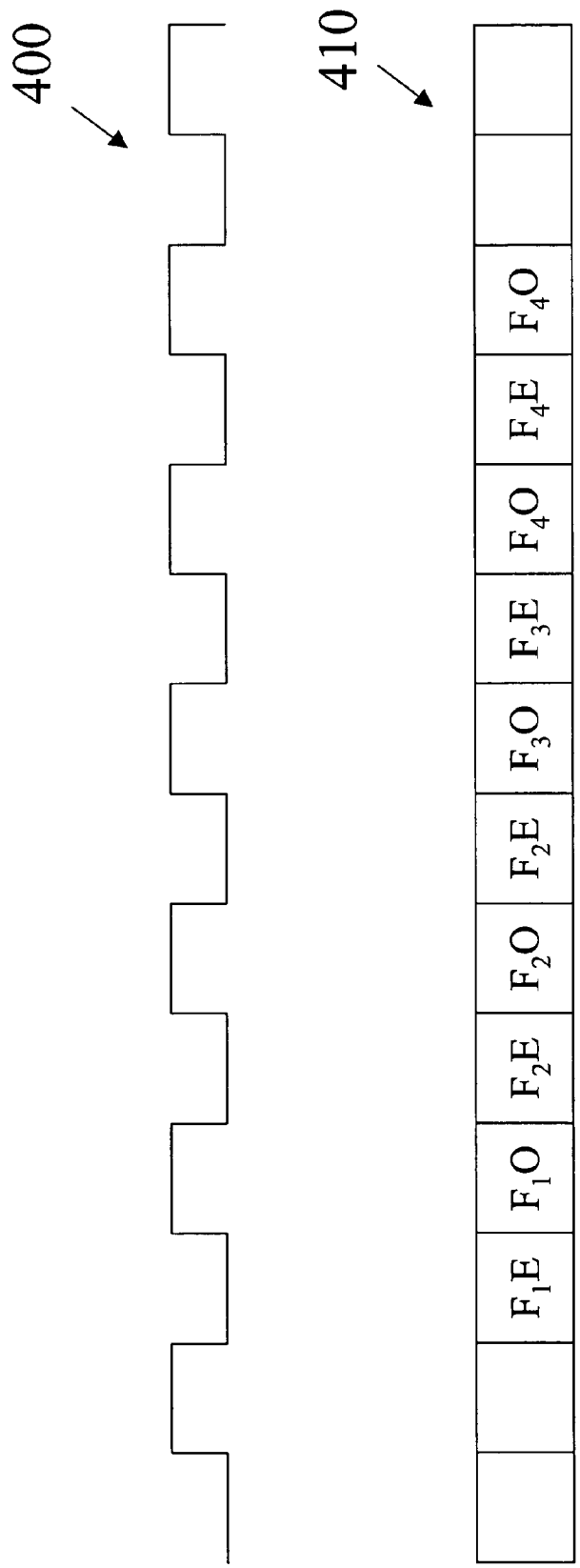
FIG. 4 is a schematic diagram illustrating a presentation sequence for displaying a film-formatted title on an NTSC-compliant display system in accordance with one embodiment of the present invention.

FIG. 4 is a schematic diagram illustrating a presentation sequence for displaying a film-formatted title on an NTSC-compliant display system in accordance with one embodiment of the present invention. Since the frame rate of the film is 23.976 and the NTSC display system has a field rate of 59.94 fields per second, between which the ratio is approximately 2/5, in a sequence 410 provided over a field time signal 400, every two resized frames are provided in five successive field times. Moreover, since the two resized frames are only responsible for four field time intervals, one additional field from the two resized frames should be added to the five field times. In sequence 410, the fifth field time is added with the even field $F_2E$ of a second resized frame $F_2$.

Figure 5:
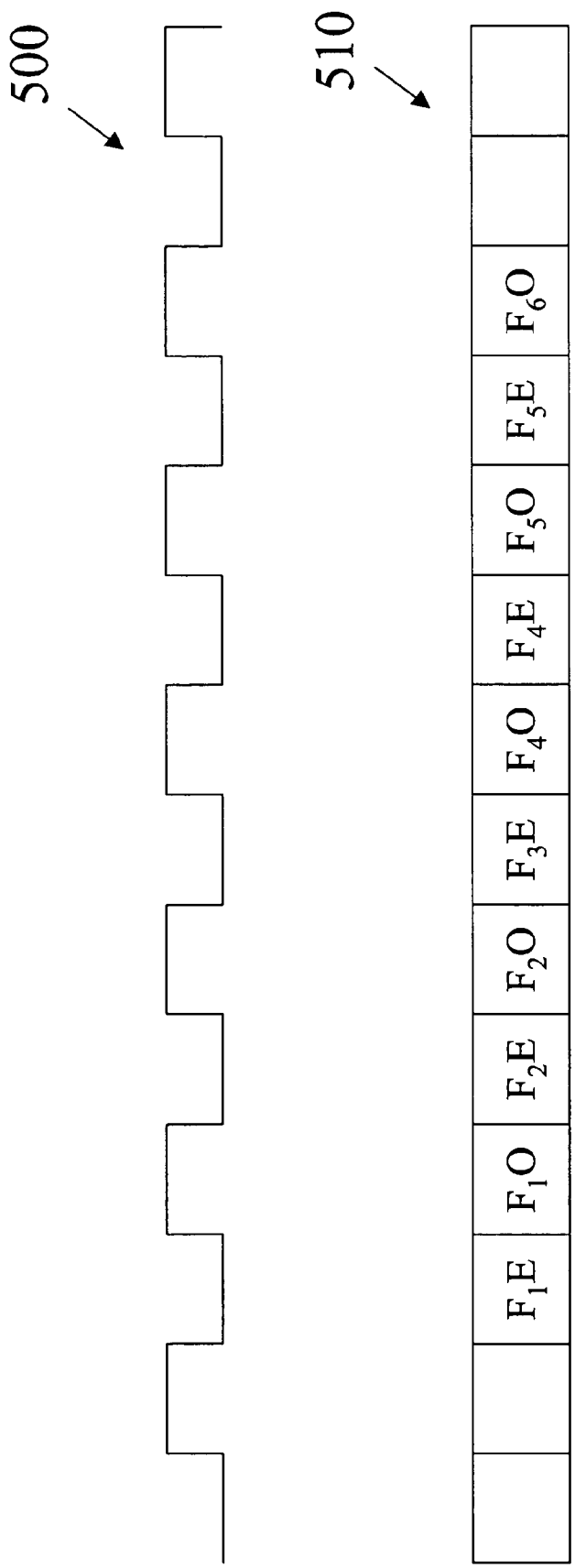
FIG. 5 is a schematic diagram illustrating a presentation sequence for displaying an NTSC-formatted title on a PAL-compliant display system in accordance with one embodiment of the present invention.

FIG. 5 is a schematic diagram illustrating a presentation sequence for displaying an NTSC-formatted title on a PAL-compliant display system in accordance with one embodiment of the present invention. Since the frame rate of the NTSC title is 29.97 and the PAL display system has a field rate of 50 fields per second, between which the ratio is approximately 3/5, in a sequence 510 provided over a field time signal 500, every three resized frames are provided in five successive field times. Moreover, since the three resized frames will be responsible for six field time intervals, one of the six fields from the three resized frames should be removed. In sequence 510, the odd field of a third resized frame $F_3$ is removed. Skilled persons in the art will understand that any one of the six fields from the three resized frames may be optionally removed from the sequence only if an interlaced relationship between even and odd fields are observed. For example, a sequence may take the form of $F_1E$, $F_1O$, $F_2E$, $F_3O$ and $F_3E$ in a sequential order, where the odd field of a second resized frame $F_2$ is removed.

Figure 6:
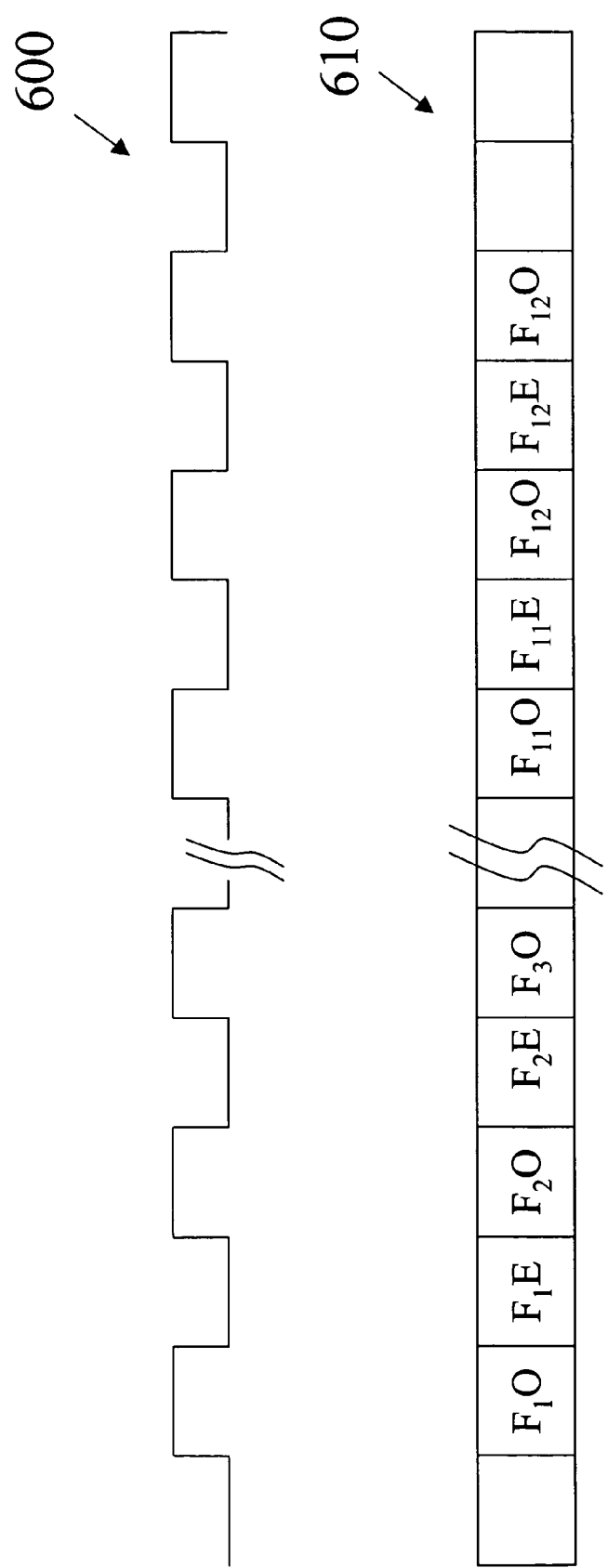
FIG. 6 is a schematic diagram illustrating a presentation sequence for displaying a film-formatted title on a PAL-compliant display system in accordance with one embodiment of the present invention.

FIG. 6 is a schematic diagram illustrating a presentation sequence for displaying a film-formatted title on a PAL-compliant display system in accordance with one embodiment of the present invention. Since the frame rate of the film-formatted title is 23.976 and the PAL display system has a field rate of 50 fields per second, between which the ratio is approximately 12/25, in a sequence 610 provided over a field time signal 600, every twelve resized frames are provided in twenty-five successive field times. Moreover, since the twelve resized frames are only responsible for twenty-four field time intervals, one additional field from the twelve resized frames should be added to make twenty-five field times. In sequence 610, the twenty-fifth field time is added with the odd field $F_{12}O$ of a twelfth resized frame $F_{12}$. Skilled persons in the art will understand that any one of the fields from the twelve resized frames may be optionally added into the sequence only if an interlaced relationship between even and odd fields are observed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus for displaying a motion video on a display system, comprising:
    a decoder for decoding the motion video to provide a decoded picture, the decoded picture having a first frame size and a first scan rate different from a second frame size and a second scan rate of the display system, respectively;
    a filter for converting the decoded picture into an intermediate picture, and then converting the intermediate picture into a resized frame picture having the second frame size; a memory for storing resized frame pictures sent from the filter;
    a controller for controlling output of the resized frame pictures from the memory in a sequence by assigning the resized frame pictures over successive field time intervals in accordance with the ratio between the first scan rate and the second scan rate; and
    a selector for providing a signal including the second frame size and the second scan rate of the display system.

2. The apparatus of claim 1, wherein the decoded picture includes a first field picture having an even polarity and a second field picture having an odd polarity, and the filter converts the decoded picture into the resized picture by skipping one of the first field and second field pictures.

3. The apparatus of claim 1, wherein the decoded picture includes a frame picture, and the filter converts the decoded picture into the resized picture by replicating every scan line of the decoded picture.

4. The apparatus of claim 1, wherein the filter decimates the decoded picture to form the resized picture, and expands the resized picture to form the resized frame picture.

5. The apparatus of claim 1, wherein the controller assigns every five of the resized frame pictures over twelve field time intervals.

6. The apparatus of claim 1, wherein the controller assigns every two of the resized frame pictures over five field time intervals.

7. The apparatus of claim 1, wherein the controller assigns every three of the resized frame pictures over five filed time intervals.

8. The apparatus of claim 1, wherein the controller assigns every twelve of the resized frame pictures over twenty-five time intervals.

9. A method for displaying a motion video on a display system, comprising:
    decoding the motion video to provide a decoded picture, wherein the decoded picture includes a first field picture having an even polarity and a second field picture having an odd polarity;
    determining a first frame size and a first scan rate of the decoded picture;
    determining a second frame size and a second scan rate of the display system, which are different from the first frame size and first scan rate of the decoded picture, respectively;
    converting the decoded picture by skipping one of the first field picture and the second field picture into an intermediate picture;
    converting the intermediate picture into a resized frame picture having the second frame size;
    storing resized frame pictures in a memory; and
    controlling output of the resized frame pictures from the memory in a sequence by assigning the resized frame pictures over successive field time intervals in accordance with the ratio between the first scan rate and the second scan rate.

10. The method of claim 9, wherein the decoded picture includes a frame picture, further comprising replicating every scan line of the decoded picture in converting the decoded picture into the intermediate picture.

11. The method of claim 9, further comprising decimating the decoded picture to form the intermediate picture, and expanding the intermediate picture to form the resized frame picture.

12. The method of claim 9, further comprising providing a signal indicating the second frame size and second scan rate of the display system.

13. The method of claim 9, further comprising assigning every five of the resized frame pictures over twelve field time intervals.

14. The method of claim 9, further comprising assigning every two of the resized frame pictures over five field time intervals.

15. The method of claim 9, further comprising assigning every three of the resized frame pictures over five filed time intervals.

16. The method of claim 9, further comprising assigning every twelve of the resized frame pictures over twenty-five field time intervals.

\* \* \* \* \*